Patented Nov. 9, 1937

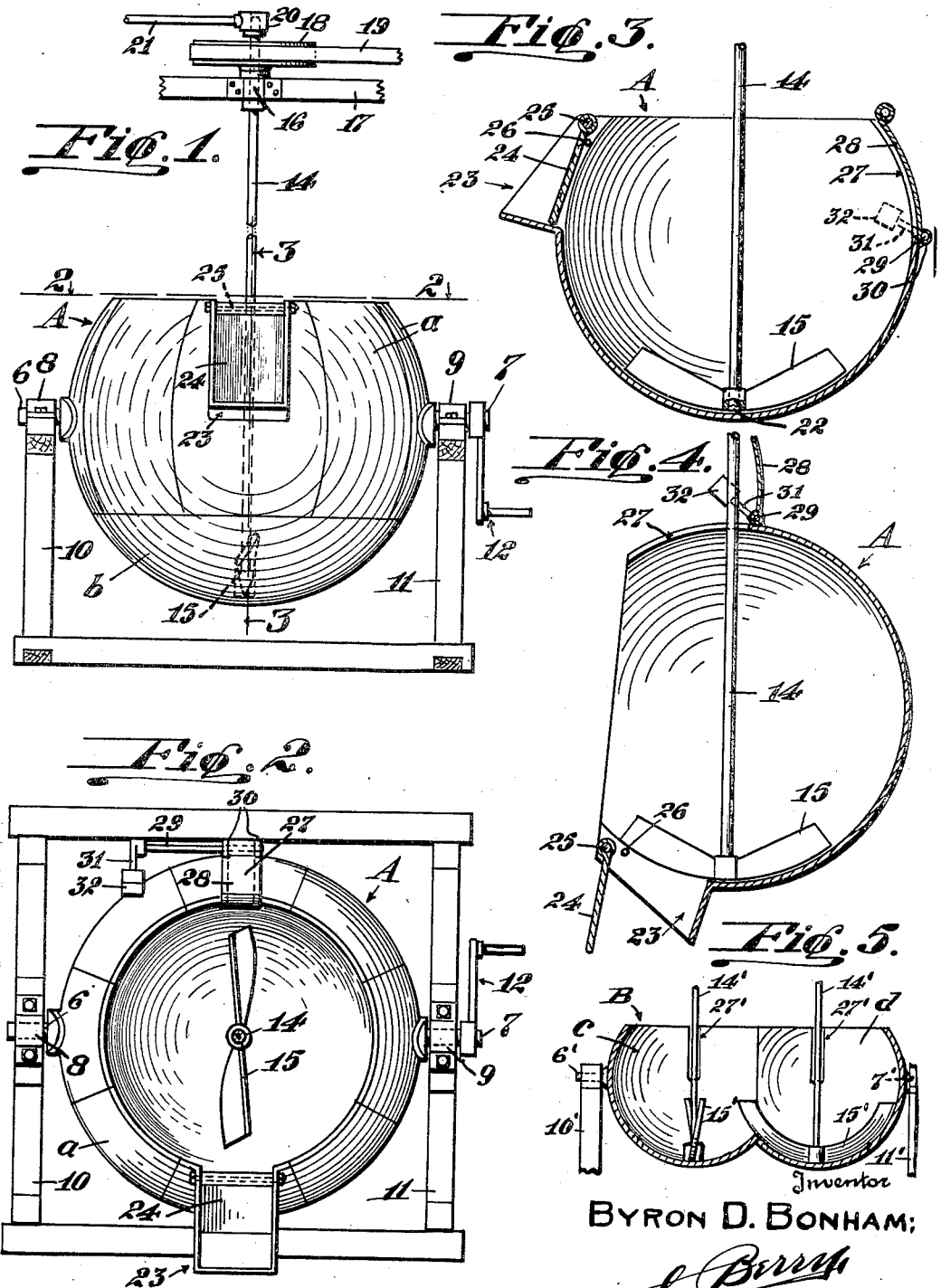

2,098,483

UNITED STATES PATENT OFFICE 2,098,483

PLASTER MIXER

Byron D. Bonham, Los Angeles, Calif.

Application July 7, 1936, Serial No. 89,340

9 Claims. (Cl. 83—73)

This invention relates to a mixing machine and more particularly pertains to a machine for mixing wet plaster, cement, and the like, of the type embodying a container for the materials to be mixed and a power driven agitator positioned in the container.

In the construction of mixers of the above character it has heretofore been the practice in order to facilitate dumping the mixed materials from the container, to either mount the agitator so that it may be withdrawn from the container during the dumping operation, or to support the agitator on the container in a fashion to permit dumping or delivery of the material from the container without removing the agitator from the container.

Where the agitator and its actuating mechanism are carried on the container, as in the usual plaster mixer, the actuating mechanism becomes coated with the mixed materials such as to interfere with the operation of the mechanism or cause undue wear thereof, and at least necessitate frequent cleaning of the mechanism; and in the type of mixers where the agitator is removed during dumping operations, considerable mechanism is involved to effect separation of the agitator and container, especially where the mixer is of large capacity.

An object of the present invention is to overcome the objectionable features of the type of mixers above pointed out, which is accomplished by constructing the mixer so that the container can be dumped to discharge its contents without removing the agitator therefrom, and with the agitator and its actuating mechanism mounted separate from the container with the actuating mechanism so remote from the container as to protect it from any splash of the materials being mixed or delivered to or discharged from the container.

Another object is to provide a mixer in which the container is turnable a partial revolution on a horizontal axis and the agitator therein is carried on a shaft revoluble on an axis extending perpendicular to the axis of rotation of the container, and in which the agitator and the walls of the container are so relatively formed as to permit their respective movement without interference with each other and without separation of the agitator and container.

Another object is to provide a mixer embodying a spheroidal container mounted to rotate on its horizontal axis, and having an open upper portion through which extends a shaft carrying impeller blades curved to conform to the spheroidal inner periphery of the container, and in which means are provided whereby the container may be rotated approximately a quarter of a revolution around its axis and its contents discharged therefrom without withdrawing the shaft and impeller blades.

With the foregoing objects in view, together with such other objects and advantages as may subsequently appear, the invention is carried into effect as illustrated by way of example in the accompanying drawing, in which:

Fig. 1 is a view of the mixer as seen in front elevation;

Fig. 2 is a plan view and horizontal section taken on the line 2—2 of Fig. 1;

Fig. 3 is a detail in vertical section taken on the line 3—3 of Fig. 1, showing the parts in their mixing position;

Fig. 4 is a view similar to Fig. 3, showing the spheroidal container as disposed in its dumping position;

Fig. 5 is a view in section with portions broken away showing a modified form of the invention.

Referring to the drawing more specifically A indicates generally a container which may be of any suitable construction to form a shell the inner periphery of which is spheroidal. As here shown the container is in the form of a segment of a hollow sphere the walls of which may be constructed in any suitable fashion, as by casting in metal, or by forming the walls of an assembly of sheet metal stampings.

As here shown the container is built in sections including a series of side wall sections $a$ united edge to edge and joined at their lower ends to a bottom section $b$ in the form of a segment of a hollow sphere, as by welding the adjacent edges of the sections together. However it is manifest that the walls of the container may be formed in various fashions. The container may be of any desired segmental portion of a sphere exceeding a hemi-sphere with the chord thereof constituting the plane of the upper margin of the container.

Formed on diametrically opposite sides of the container are axially aligned trunnions 6 and 7 the axes of which extend in continuation of the horizontal axis of the container and which trunnions are journalled in bearings 8 and 9 carried on supporting frame members 10 and 11 between which the container is supported by the trunnions to swing laterally. One of the trunnions is fitted with a crank 12 as a means for facilitating manual swinging of the container.

Projecting into the container in axial alignment with the vertical axis of the latter is a revoluble shaft 14, the lower end of which is fitted with agitator blades 15 having their lower margins contoured to substantially conform to the concave curvature of the inner periphery of the container, and which shaft is journalled in a bearing 16 on a frame 17 spaced remotely from the container, is equipped with a pulley wheel 18 engaged by a driving belt 19, is tubular, and is fitted at its upper end with a swivel head 20 connecting with a fluid supply conduit 21.

The lower end of the tubular shaft 14 opens to the interior of the container A through the hub of the agitator 15 as indicated at 22 in Fig. 3 whereby fluid may be directed into the material being mixed as occasion may require.

Formed on one side portion of the container is a discharge spout 23 projecting from the container above the plane of the horizontal axis thereof and intermediate the trunnions 6 and 7; the vertical center of the spout lying on a plane perpendicular to the aligned horizontal axes of the trunnions.

The spout 23 is fitted with a gate 24 pivotally mounted on a horizontal shaft 25 carried on the upper portion of the side walls of the spout 23; the gate 24 depending from the shaft 25 as shown in Fig. 3 to normally maintain the spout 23 closed. An abutment pin 26 on the side wall of the spout serves to limit the downward and inward swinging movement of the gate 24; the abutment being arranged to position the gate when closed with its inner face spaced outwardly from the spheroidal inner periphery of the container.

Formed in the container side wall diametrically opposite the spout 23 is a vertical slot 27 leading downwardly from and opening to the margin of the container and which slot is positioned so that on rotation of the container around the horizontal axis afforded by the trunnions 6 and 7 to swing the spout 23 downwardly, the vertical shaft 14 will be received in the slot 27 thus permitting rotation of the container a distance determined by the length of the slot 27 and which will permit turning of the container at least nearly a quarter of a revolution such as to permit positioning of the spout 23 in a downward direction as shown in Fig. 4. In order to avoid splash of materials being mixed through the slot 27 the latter is fitted with a closure 28 comprising a plate curved longitudinally to conform to the longitudinal curvature of the side margins of the slot 27 and which plate is affixed on a shaft 29 journalled in bearings 30 formed on the container A adjacent the lower end of the slot 27 so that the closure 28 may be swung toward and away from the container side wall. The shaft 29 is extended from its bearings in parallel relation with the axes of the trunnions 6 and 7 and is fitted with an arm 31 extending inwardly toward the container with a weight 32 on the outer end thereof which weight acts to yieldably oppose opening of the closure 28 and serves to automatically swing the latter from its open to its closed position.

On swinging the container to effect dumping of the contents thereof the outer upper end of the closure 28 moves against the shaft 14 and on continuing movement of the container relative to the shaft the latter acts to swing the closure 28 outwardly to its open position as shown in Fig. 4. On reversing the direction of movement of the container the weight 32 acts to restore the closure 28 to its slot closing position.

In the operation of the invention the materials to be mixed are positioned in the container and the shaft 14 revolved to effect rotation of the agitator blades 15 which function in the usual manner to effect intermixture of the materials in the container; the container then being maintained in its upright position shown in Figs. 1, 2 and 3, in any suitable manner. When it is desired to discharge the contents of the container the latter is rotated on its trunnions 6 and 7 as by turning the crank 12 in such direction as to move the spout 23 downwardly and during which movement the gate 24 automatically swings relative to the container toward its open position. At the same time on the upper end of the closure 28 riding against the shaft 14 it is caused to open as before described to permit the shaft 14 to enter the slot 27. During this operation the agitator may or may not be continued in rotation as occasion may require since by reason of the interior of the container being spheroidal and its being turned on its horizontal axis the blades will be maintained in their mixing relation with the inner periphery of the container irrespective of any position the latter may assume around its axis. In this fashion the container may be operated to effect the discharge of its contents without disturbing the agitator.

The invention is also applicable to a mixer having a multiple of agitators as shown for example in Fig. 5, in which the mixer is shown as embodying a container B having a pair of communicating spheroidal mixing chambers c and d and in each of which chambers is arranged an agitator blade 15' carried on a vertical shaft 14' thus providing the mixer with a pair of mixing blades which are revoluble independent of each other. The blade 15' in chamber c is positioned to extend at right angles to the blade 15' in the chamber d whereby the blade lengths may be extended so that their outer ends will traverse overlapping paths of travel. With this arrangement of the blades the shafts 14' are revolved at corresponding speeds whereby the pair of agitator blades 15' will not interfere with each other.

The container B is supported on horizontal axially aligned trunnions 6' and 7' journalled on supports 10' and 11', and the back walls of the chambers c and d are formed with vertical slots 27' open at their upper ends to receive the shafts 14' on turning the container B to a dumping position in the fashion recited with reference to the construction shown in Figs. 1 to 4 inclusive.

While the mixer embodying the invention as herein set forth is subject to being employed in mixing various materials it has been found in practice to be especially applicable for use in mixing plasters of the character embodying sand, lime, gypsum, cement, and fibrous materials, intermixed with water, which plaster hardens when dry and because of its gritty and abrasive nature is destructive to gears and bearings as commonly employed in plaster mixers where gears and bearings are usually located in such proximity to the agitator as to become splashed with plaster. By the arrangement here shown the agitator operating mechanism is arranged sufficiently remote from the container as not to be subject to any splash from the container.

While I have shown and described a specific embodiment of my invention I do not limit myself to the exact details of construction and arrangement shown but may employ such changes and modifications in the parts as occasion may require coming within the meaning and scope of the appended claims.

I claim:

1. A mixer comprising a container mounted to swing around a horizontal axis, a revoluble shaft extending downwardly into said container, an agitator on said shaft within said container, and means for supporting and driving said shaft remote from and independent of container, said container having a side wall formed with a slot to receive said shaft on swinging said container on its horizontal axis.

2. A mixer comprising a revoluble shaft, a support on which said shaft is carried to depend therefrom, a container having an open upper end into which the lower end portion of said shaft projects, an agitator on said shaft arranged interiorly of said container, trunnions on said container, and a support for said trunnions, said container being turnable on said support around a horizontal axis independent of said shaft and agitator, said container having its margin extending on a plane spaced above the plane of the axes of said trunnions and being formed with a side wall slot leading from its margin arranged to receive said shaft on swinging said container to dispose its open end downwardly.

3. In a mixer, a container having a spheroidal inner periphery, means for supporting said container for rotation around a horizontal axis, a revoluble shaft extending downwardly into said container, agitator blades carried by said shaft disposed contiguous the inner periphery of the container, and means for supporting and driving said shaft independent of and remote from said container, said container having a vertical open ended slot leading downwardly from the margin thereof arranged to receive said shaft on turning said container around its horizontal axis into a dumping position.

4. In a mixer, a container the inner periphery of which conforms to a segment of a sphere exceeding a hemisphere, a mounting for said container on which the latter is turnable around a horizontal axis, a revoluble shaft extending downwardly into said container, an agitator carried by said shaft arranged adjacent the inner periphery of the container, means for supporting and driving said shaft independent of said container, said container being formed with a vertically extending open ended slot leading from the rim thereof and arranged to receive said shaft on tilting the container around its horizontal axis.

5. In a mixer, a container having a spheroidal inner periphery, means for supporting said container for rotation around a horizontal axis, a revoluble shaft extending downwardly into said container, agitator blades carried by said shaft disposed contiguous the inner periphery of the container and means for supporting and driving said shaft independent of and remote from said container, said container having a vertical open ended slot leading downwardly from the margin thereof arranged to receive said shaft on turning said container around its horizontal axis into a dumping position, and a closure for said slot arranged to be engaged by said shaft as the latter enters said slot to effect opening of said closure.

6. In a mixer, a container the inner periphery of which conforms to a segment of a sphere exceeding a hemisphere, a mounting for said container on which the latter is turnable around a horizontal axis, a revoluble shaft extending downwardly into said container, an agitator carried by said shaft arranged adjacent the inner periphery of the container, means for supporting and driving said shaft independent of said container, said container being formed with a vertically extending open ended slot leading from the rim thereof and arranged to receive said shaft on tilting the container around its horizontal axis, and a spout on said container projecting therefrom opposite said slot.

7. In a mixer, a container the inner periphery of which conforms to a segment of a sphere exceeding a hemisphere, a mounting for said container on which the latter is turnable around a horizontal axis, a revoluble shaft extending downwardly into said container, an agitator carried by said shaft arranged adjacent the inner periphery of the container, means for supporting and driving said shaft independent of said container, said container being formed with a vertically extending open ended slot leading from the rim thereof and arranged to receive said shaft on tilting the container around its horizontal axis, and a spout on said container projecting therefrom opposite said slot, and a closure for said spout.

8. In a mixer, a container the inner periphery of which conforms to a segment of a sphere exceeding a hemisphere, a mounting for said container on which the latter is turnable around a horizontal axis, a revoluble shaft extending downwardly into said container, an agitator carried by said shaft arranged adjacent the inner periphery of the container, means for supporting and driving said shaft independent of said container, said container being formed with a vertically extending open ended slot leading from the rim thereof and arranged to receive said shaft on tilting the container around its horizontal axis, and a spout on said container projecting therefrom opposite said slot, and a closure for said spout, said closure being hinged and arranged adjacent the inner end of said spout and exteriorly of the inner periphery of the container.

9. In a mixer, a container having an open upper portion and formed with a pair of communicating chambers of spheroidal internal contour, a vertical shaft extending downwardly into each of said chambers diametrically thereof, agitator blades on each of said shafts disposed contiguous the inner peripheries of said chambers, and a mounting for said container on which the latter is turnable around a horizontal axis independent of said shafts, there being open ended slots in the side walls of said chambers leading downwardly from the margin thereof for receiving said shafts on turning said container relative thereto to a dumping position.

BYRON D. BONHAM.